US006052336A

United States Patent [19]

Lowrey, III

[11] Patent Number: 6,052,336

[45] Date of Patent: Apr. 18, 2000

[54] APPARATUS AND METHOD OF BROADCASTING AUDIBLE SOUND USING ULTRASONIC SOUND AS A CARRIER

[76] Inventor: Austin Lowrey, III, c/o Austin Lowrey Associates 7212 Reservation Dr., Springfield, Va. 22153

[21] Appl. No.: 09/070,850

[22] Filed: May 1, 1998

Related U.S. Application Data

[60] Provisional application No. 60/046,803, May 2, 1997.

[51] Int. Cl.[7] .......................... H01M 29/02; H04R 25/00

[52] U.S. Cl. .......................... 367/139; 367/137; 367/134

[58] Field of Search .......................... 367/137, 139, 367/134; 381/77; 455/46; 607/56

[56] References Cited

U.S. PATENT DOCUMENTS 5,159,703 10/1992 Lowery .......................... 455/42

5,889,870 3/1999 Norris .......................... 381/77

OTHER PUBLICATIONS

"In The Audio Spotlight" by David Schneider; Scientific American, News and Analysis (Oct. 1998); pp. 40–41.

*Primary Examiner*—Daniel T. Pihulic
*Attorney, Agent, or Firm*—Staas & Halsey LLP

[57] ABSTRACT

An ultrasonic sound source broadcasts an ultrasonic signal which is amplitude and/or frequency modulated with an information input signal originating from an information input source. If the signals are amplitude modulated, a square root function of the information input signal is produced prior to modulation. The modulated signal, which may be amplified, is then broadcast via a projector unit, whereupon an individual or group of individuals located in the broadcast region detect the audible sound.

21 Claims, 4 Drawing Sheets

APPARATUS AND METHOD OF BROADCASTING AUDIBLE SOUND USING ULTRASONIC SOUND AS A CARRIER

CROSS REFERENCE TO RELATED APPLICATION

This application claims the benefit of U.S. provisional application Ser. No. 60/046,803, filed May 2, 1997, entitled A METHOD FOR TRANSMITTING AUDIBLE SOUNDS THROUGH THE AIR USING ULTRASONIC SOUND AS A CARRIER by Austin Lowrey, III and incorporated by reference herein.

BACKGROUND OF THE INVENTION

1. Field of the Invention

The present invention is directed to an apparatus and method of broadcasting an audible sound, and in particular, to an apparatus and method of broadcasting an audible sound using an ultrasonic sound as a carrier modulated by the audible sound as an input signal.

2. Description of the Related Art

Over the past few years, several situations have arisen in military and civil areas where crowds, with or without leaders, have posed a serious problem to Government forces.

For example, in Somalia, leader General Aideed would almost never remain outside unless surrounded by a crowd of sympathizers. Troops attempting to seize or capture the leader would have to engage the crowd, probably killing or injuring some, in order to get close enough to capture him. Hence, forces were not likely to attempt to capture the leader.

Another example is the U.S. invasion of Haiti, where a ship with troops was sent to perform various actions that would have been helpful to the population living there. The landing of these troops was, however, opposed by a crowd on the dock. Hence, in order to land, the crowd on the dock must first be disposed of. Again, crowd members would likely be hurt, resulting in the troops deciding not to act.

Still another example is any situation where an angry crowd gathers. In this situation, the crowd frequently turns to looting and destruction of property. It is a constant challenge for, for example, police to disperse such a crowd without causing casualties, perhaps fatal ones.

All of these examples have a common theme, namely a crowd or leader that one would like to influence such that they leave or stop their hostile activities.

SUMMARY OF THE INVENTION

It is an object of the present invention to provide a nonlethal individual or crowd control device which uses an audible sound broadcasted using an ultrasonic sound as a carrier.

It is another object of the present invention to provide a device that will allow the hearing impaired to hear speech.

It is still another object of the present invention to provide a device that will emit audible sound to listeners located in a defined area.

It is yet another object of the present invention to provide a low frequency sound, either audible or sub-audible frequency, in the heads of listeners.

In one embodiment of the present invention, there is provided an apparatus including a unit amplitude modulating an ultrasonic signal with a square root of an information signal to produce a modulated signal, and a projector coupled to the unit and projecting the modulated signal to a listener.

In one aspect of the embodiment, the apparatus further includes a circuit producing the square root of the information signal, a modulator amplitude modulating the ultrasonic signal with the square root of the information signal, a first sound source outputting the information signal, and a second sound source outputting the ultrasonic signal.

In another aspect of the embodiment, the information signal is a voice signal from, for example, a microphone.

In another embodiment of the invention, there is provided a method of modulating an ultrasonic signal with a square root of an information signal to produce a modulated signal, and projecting the modulated signal to a listener.

In one aspect of the embodiment, the method further includes producing a square root signal from the information signal, modulating the ultrasonic signal with the square root of the information signal to produce the modulated signal, amplifying the modulated signal, and transmitting the amplified modulated signal.

In another aspect of the embodiment, the modulating is an amplitude modulation.

In yet another embodiment of the present invention, there is provided an apparatus including a first modulator frequency modulating a first ultrasonic signal with a first input signal to produce a first modulated signal, an ultrasonic signal source providing a second ultrasonic signal, and a broadcasting system, coupled to the first modulator and the ultrasonic signal source, broadcasting the first modulated signal and the second ultrasonic signal to a listener.

In one aspect of the embodiment, the apparatus further includes a first projector projecting the modulated signal, a second projector projecting the second ultrasonic signal, a first input sound source outputting the first input signal, a second ultrasonic signal source providing the first ultrasonic signal, a second modulator amplitude modulating the second ultrasonic signal with a second input signal to produce a second modulated signal, a second input sound source outputting the second input signal, and an amplifier amplifying the amplitude modulated signal.

In another aspect of the embodiment, the first and second ultrasonic signals produce a difference signal for the listener in an audible range of the listener.

In yet another aspect of the embodiment, the input signal is a square root of an information signal.

In still another aspect of the embodiment, the information signal is a voice from, for example, a microphone.

In still another embodiment of the present invention, there is provided a method of frequency modulating a first ultrasonic signal with a first input signal to produce a first modulated signal, providing a second ultrasonic signal, and broadcasting the first modulated signal and the second ultrasonic signal to a listener.

In one aspect of the embodiment, the method includes amplitude modulating the second ultrasonic signal with a second input signal to produce a second modulated signal, amplifying the amplitude modulated signal, and projecting the first and second modulated signals in the audible range of the listener.

In yet another embodiment of the present invention, there is provided an apparatus including a unit modulating an ultrasonic signal with an information signal to produce a modulated signal in which the information signal is completely intelligible to a listener, and a projector coupled to the unit and projecting the modulated signal to the listener.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF PREFERRED EMBODIMENTS

Figure 1:
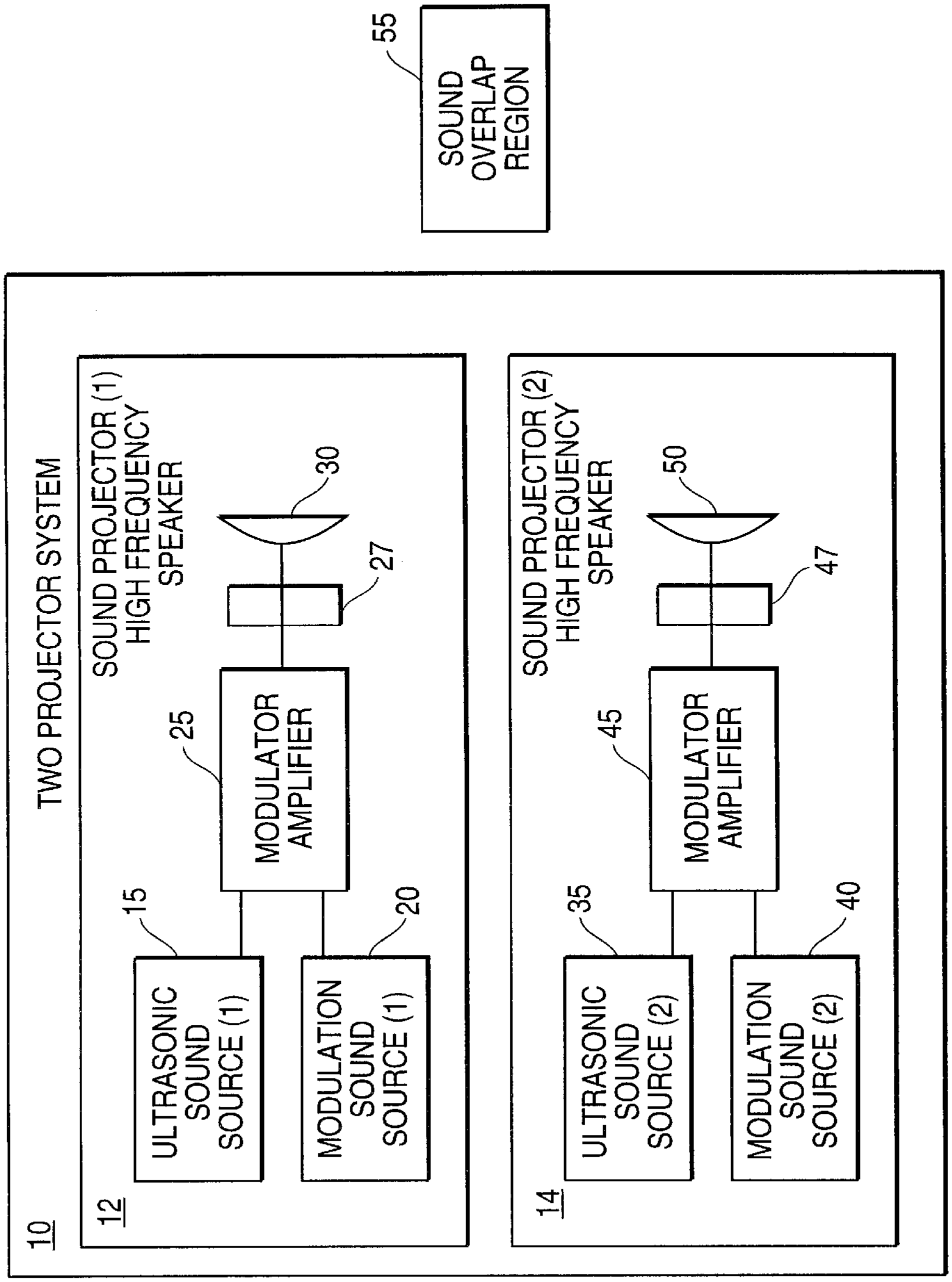
FIG. 1 illustrates an exemplary embodiment of a two projector system for broadcasting an audible sound using an ultrasonic sound as a carrier.

An apparatus and method of using ultrasonic sound to create audible sounds in the heads of individuals, or of a crowd of individuals, will be described. The sounds could be voices, music or ringing sounds to cause discomfort, disorientation, or low frequency vibrations that have been shown to induce discomfort.

The physical principles involved in such devices will be described together with the way that they would be used to disrupt or affect the actions of an individual or crowd. Additionally, examples will be used to indicate ways in which to handle the situations described above.

QUALITATIVE DESCRIPTION

PRELIMINARY CONSIDERATIONS

The use of sound controlling groups or crowds in both civil and military situations was considered at least as far back as World War II. Psychological studies on sounds that produce an aversive effect, or a pleasant effect, have been reported since the early decades of this century. Work in the nineteenth century by Helmholtz and Lord Rayleigh (detailed below) show an understanding of the effect that combination tones, or beats, with low frequencies (less than about one hundred Hertz) have on the pleasant or unpleasant quality of a sound.

Crowds can largely be divided into two kinds; those with leaders, and those without. A crowd with a leader can be affected either by limiting the communication between the leader and the crowd, or by directly affecting the crowd. A crowd without a leader (such as a looting mob) can only be affected by something that influences everyone in the crowd. Thus, it is necessary to develop physical methods to either impair communication, or to produce a physical or psychological effect in all persons exposed to the system.

Some of the methods suggested for affecting an entire crowd involve very high intensity sound (120 dB or more above the standard level of $2\times10^{-5}$ N/m$^2$). Sirens or very low frequency vibrations (less than 100 Hertz) are frequently spoken of.

Studies indicate several classes of sound to be of interest in crowd control. One class of sounds includes those which are aversive in themselves. Examples of these are: (1) scraping noises, such as that of chalk on a blackboard, (2) the crying of a baby, and (3) screams of pain. These sounds almost involuntarily cause a person to avert his/her attention from what he/she is doing, at least momentarily. Repeated exposure to this class of sounds, if the occurrence is not predictable, tends to produce jumpiness and sometimes leads to irrational behavior.

Secondly, there are a class of sounds which will cause a person to be startled and divert his/her attention from the task that he/she is doing because they indicate a possible imminent danger to him/her. Examples are: (1) gunfire, and (2) automobile crash noises.

Both of these classes of sound will likely produce a "startle" reaction in a crowd the first time that they are used. If the crowd, however, identifies the source as, for example, a loudspeaker, they will likely adapt to and ignore the noise. If the crowd mills around for a longer time, the sounds could cause headaches and other symptoms of stress. The crowd may disperse, but this is not at all certain.

If, on the other hand, one is trying to stop a fleeing person, a sudden noise, such as the screech of brakes, would undoubtedly cause the person to be startled and try to see whether the noise indicated impeding danger to him/her. He/She will clearly be disoriented for a few seconds, although the average time will vary from person to person. The sound of a gunshot may, for example, cause the same effect, or it may simply cause the person to run faster or run in a weaving manner.

A third class of sound includes low frequency vibrations either slightly above or below 20 Hertz; the lower audible limit. Vibrations in this frequency range produce several effects on a person's body.

Resonances of several internal organs lie in this frequency range. It has been shown that exposure to vibrations at an organ resonance cause nausea and a general feeling of malaise. Vibrational amplitudes that are too high will cause physical damage to the organs, whereas vibrations at a constant frequency or starting very low an rising through the range appear to cause a feeling of unease and tend to increase the suggestibility of a crowd.

The effects on a person's mood appear to be caused by hitting frequencies close to the alpha frequency of the brain waves. A phenomenon called "entrainment" occurs when the brain is stimulated at frequencies close to 10 Hz. This means that the brain's natural frequency is pulled close to, and sometime equal to, the stimulating frequency. A normal brain displays a prominent "alpha" pattern (8 to 12 Hz) at a time of relaxed alertness. Tense alertness, such as caused by freeway driving, leads to a "beta" pattern with a frequency of 13 Hz or higher. A relaxed, dreamlike state causes a "theta" pattern of frequencies from 4 to 8 Hz.

Other experiments, such as the ones cited by Norbert Wiener in "Nonlinear Problems in Random Theory", found that "a decidedly unpleasant sensation" was produced by stimulating the brain at "about 10 Hz." In fact, Helmholtz argues that beats of frequency less than 40 Hz are not perceivable as tones, but rather create a jarring feeling and are responsible for the unpleasant sensation of dissonant combinations of notes in music. As the low notes of the organ are in the range of 30 Hz, it would seem that tones ranging in frequency from about 12 to 40 Hz will produce an unpleasant feeling, or suggestibility. These tones are probably useful in crowd control used either by themselves, or to induce a mood that could then be triggered by another sound.

In producing low frequency vibrations with a conventional loudspeaker, several problems arise. First, at frequencies as low as this, loudspeakers are not very efficient in producing sound. The speaker will have to be quite large. Second, there is very little directivity possible with frequencies this low. Directive arrays would be huge, making it almost impossible to define an area where the effect occurs or to draw a line in the sand where individuals start feeling the effect when they cross it. Finally, the signal would be strongest at the speakers, requiring protective gear for at least the operators, and probably for all of the crowd control personnel.

Methods to impede communication between a speaker and a crowd have also been examined. One of the most interesting is techniques includes playing back to a speaker his/her own voice with a slight delay (less than a second). The speaker stutters and trips on his/her words unless he/she slows down his/her rate of delivery a great deal.

If two moderately loud audible tones of different frequency are received by the ear simultaneously, then, in addition to the two original tones, somewhat weaker tones with frequencies given by the sum and the difference of the original frequencies can be heard. This is called the Beat Frequency phenomenon when the two frequencies are close together, and the Combination Tone phenomenon when they are not. The combination tones are caused by a non-linear response by the ear to somewhat loud sounds. The details of the production of these tones are discussed in more detail herein below.

It is important, and in fact one of the critical physical principles in this invention, that an audible combination tone can be heard even when the two original tones are ultrasonic so that their frequencies lie above 20,000 Hz, the upper limit of audibility. In this case, the combination tone corresponds to the difference of the two original frequencies and is audible if it lies in the 20–20,000 Hz range of audibility.

The present invention shows ways in which, by altering the frequency and amplitude of one of the ultrasonic tones, the difference tone can be made to be a single tone (possibly of very low frequency), a scream or shot, or a voice.

More detailed discussions will be deferred until the "Technical Description" hereinbelow. We will discuss a way of causing a targeted person (or group) to hear whatever pattern of sound, be it speech or anything else, that we wish.

A combination tone is produced in the heads of all individuals exposed to both ultrasonic tones. If you are exposed to only one, you hear nothing, Additionally, these individuals are unable to detect the source of the sound.

The following exemplary systems are described. One includes two directional projectors, each capable of generating a powerful ultrasonic tone and directing the beam to a desired point or area. At least one of the projectors is capable of modulating the sound either in frequency, amplitude or both. The projectors would probably be separated by some distance, but this depends on the desired effect, which governs the design.

Another includes a single projector with the capability of modulating the amplitude of the projected signal.

More specifically, FIG. 1 illustrates an exemplary embodiment of a two projector system for broadcasting an audible sound using an ultrasonic sound as a carrier. Two projector system 10 includes, for example, first projection unit 12 and second projection unit 14. First projection unit 12 includes, for example, ultrasonic sound source 15 (such as a conventional ultrasonic signal generator) which generates an ultrasonic signal, modulation sound source 20 (such as a microphone) which generates an information signal (such as a tone), modulator 25 (such as a conventional frequency modulator) which frequency modulates the ultrasonic signal with the information signal to produce a modulated signal, amplifier 27 (such as a conventional amplifier) amplifying the modulated signal, and projector 30 (such as an ultrasonic speaker—a tweeter type speaker) which emits the amplified signal. Second projection unit 14 includes, for example, ultrasonic sound source 35 (such as a conventional ultrasonic signal generator) which generates another ultrasonic signal, modulation sound source 40 (such as a microphone) which generates another information signal (such as a voice), modulator 45 (such as a conventional amplitude modulator) which amplitude modulates the ultrasonic signal with the information signal to produce a modulated signal, amplifier 37 (such as a conventional amplifier) which amplifies the modulated signal, and projector 50 (such as an ultrasonic speaker—a tweeter type speaker) which emits the amplified signal. Sound overlap region 55 is the region where the sound waves of projectors 30 and 50 overlap. Two projector system 10 is not, however, limited to the embodiments described above. For example, two projector system 10 may include first projector unit 12 and second projector unit 14, wherein projector unit 12 includes, for example, ultrasonic sound source 15, modulation sound source 20, modulator 25, and projector 30, and projector unit 14 includes, for example, ultrasonic sound source 35 and projector 50. That is, projector unit 14 need not have sound source 40. Similarly, sound overlap region 55 is the region where the sound waves of projectors 30 and 50 overlap.

Figure 2:
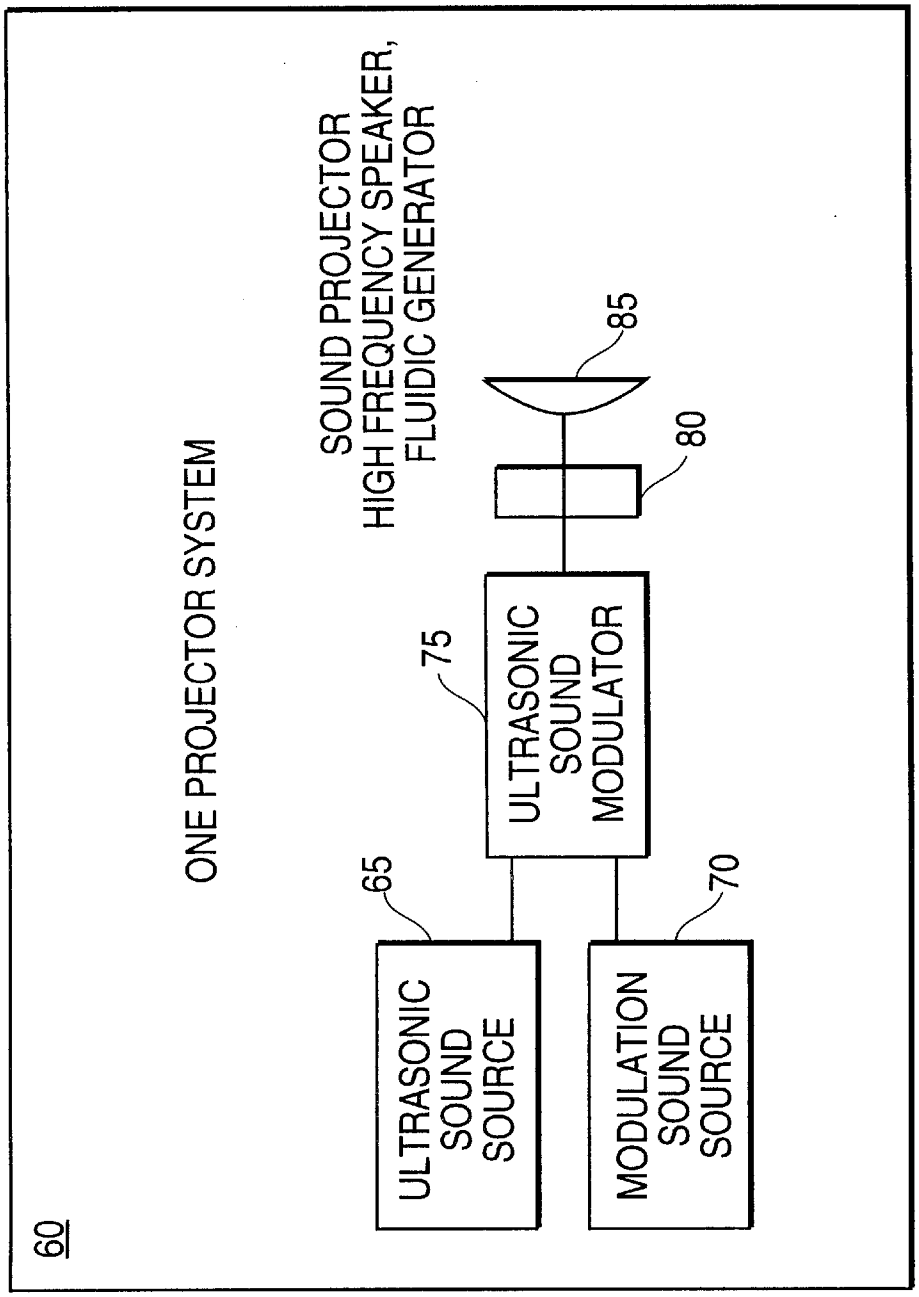
FIG. 2 illustrates an exemplary embodiment of a one projector system for broadcasting an audible sound using an ultrasonic sound as a carrier.

FIG. 2 illustrates an exemplary embodiment of a one projector system for broadcasting an audible sound using ultrasonic sound as a carrier. This system could be for crowd control, an improved hearing aid for the hearing impaired, or to emit audible sound to listeners located in a defined area. One projector system 60 includes, for example, ultrasonic sound source 65 (such as a convention ultrasonic signal generator) which generates an ultrasonic signal, modulation sound source 70 (such as a microphone) which generates an information signal (such as a voice), modulator 75 (such as a conventional amplitude modulator) which modulates the ultrasonic signal with the information signal to produce a modulated signal, amplifier 80 (such as a conventional amplifier) which amplifies the modulated signal, and projector 85 (such as a conventional ultrasonic speaker a tweeter type speaker) which emits the amplified signal.

Figure 3:
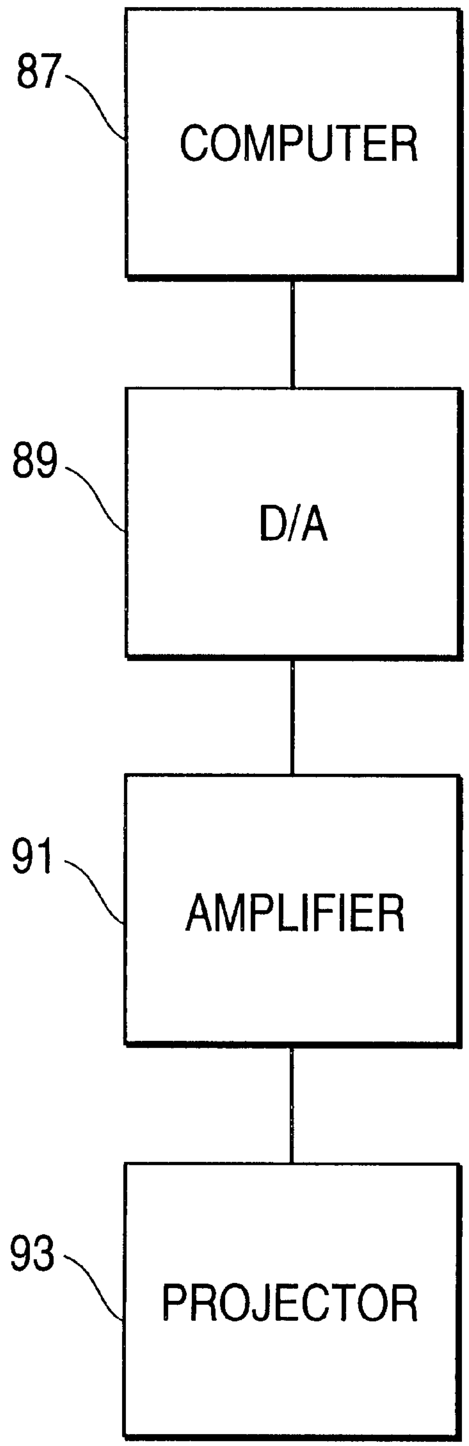
FIG. 3 illustrates an exemplary embodiment of a projector system using computer based signal processing.

FIG. 3 illustrates an exemplary embodiment of a projector system using computer based signal processing. For example, in a one projector system, such as illustrated in FIG. 2, computer 87 operates as ultrasonic sound source 65, modulation sound source 70 and modulator 75. Computer 87 generates an ultrasonic sound signal and generates or inputs an audible sound signal, and then modulates the two signals. Computer 87 can modulate the two signals using, for example, conventional frequency or amplitude modulation techniques or the techniques described hereinbelow. The modulates signal produced by computer 87 is then transmitted to digital-to-analog (D/A) converter 89, whereupon the digital signal is converted to an analog signal. The analog signal produced by D/A converter 89 is then amplified by amplifier 91, and transmitted to projector 93. Projector 93 then emits the amplified signal to a listener. The same principles can be applied to the two projector system illustrated in FIG. 1.

Figure 4:
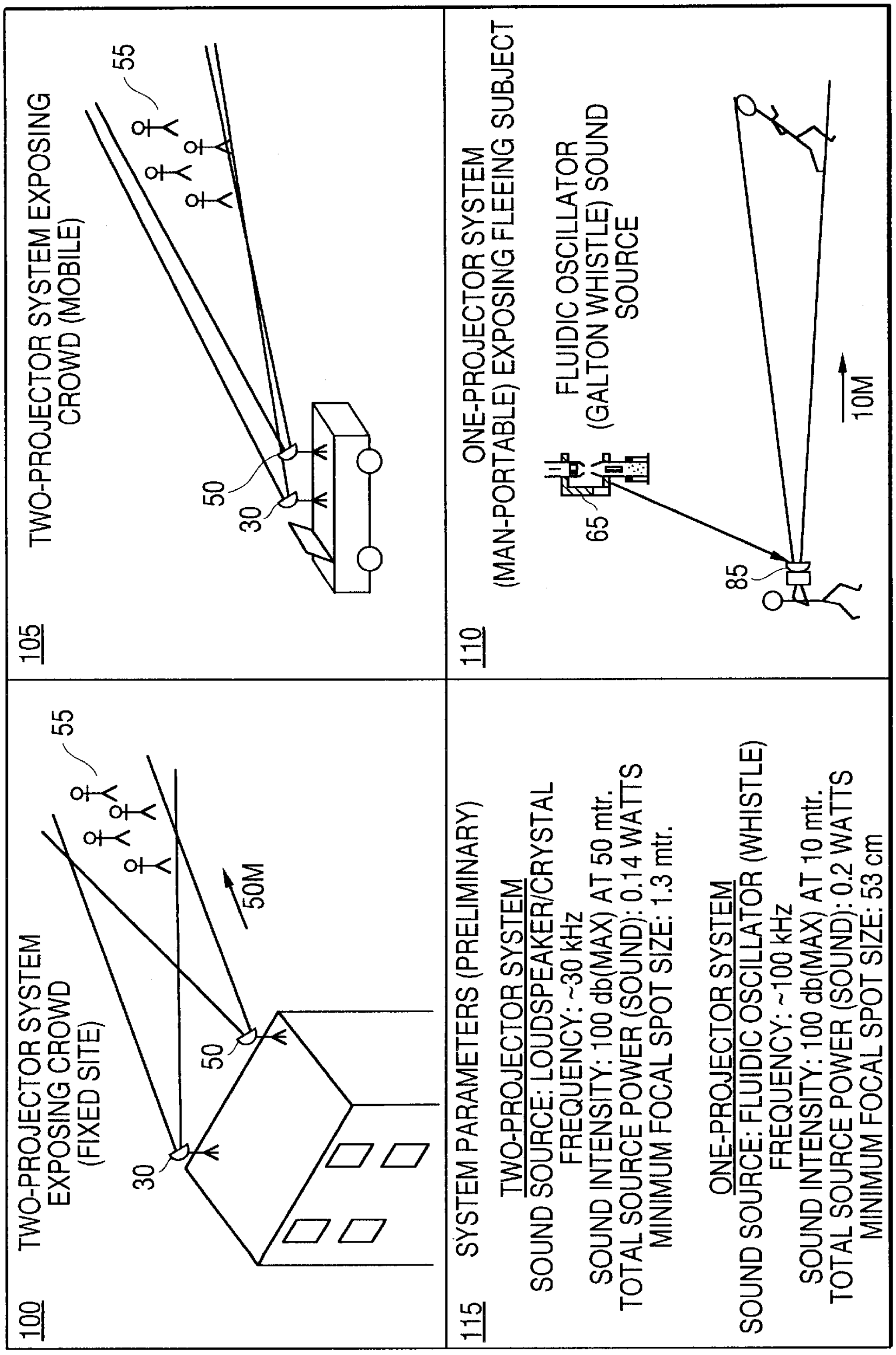
FIG. 4 illustrates exemplary embodiments of one and two projector systems employed in a stationary and mobile environment.

FIG. 4 illustrates exemplary embodiments of one and two projector systems employed in a stationary and mobile environment. For example, reference numeral 100 illustrates two projector system 10 (illustrated in FIG. 1) in a stationary environment. In this example, projectors 30 and 50 are mounted on the top of a building, and directed towards sound overlap region 55. A person or crowd located in sound overlap region 55, located, for example, 50M from projectors 30 and 50, detects the broadcasted sound(s). Reference numeral 105, on the other hand, illustrates two projector system 10 in a mobile environment. In this example, projectors 30 and 50 are mounted in the back of a vehicle. The vehicle may then be directed to move with the individual or crowd, as the individual or crowd moves, such that the individual or crowd remains in sound overlap region 55.

When employing two projector system 10, system parameters may include, for example, the following: (1) sound source=loudspeaker/crystal, (2) frequency=~30 kHz, (3) sound intensity=100 db (max) at 50 meters, (4) total source power (sound)=0.14 Watts, and (5) minimum focal spot size=1.3 meters, as illustrated by reference numeral 115 in FIG. 4.

Reference numeral 110 illustrates one projector system 60 (illustrated in FIG. 2) in a man-portable environment. In this example, an individual, such as a police officer, may direct projector 85 of one projector system 60 toward, for example, a fleeing individual. An individual located within the broadcasting area of one projector system 60 will detect a modulated signal projected by projector 85. The modulated signal will include, for example, an ultrasonic sound, such as a whistle, amplitude modulated with an information signal, such as a voice. System parameters may include, for example, the following: (1) sound source=fluidic oscillator (whistle), (2) frequency=~100 kHz, (3) sound intensity=100 db (max) at 10 meters, (4) total source power (sound)=0.2 Watts, and (5) minimum focal spot size=53 cm.

Listed below are some of the useful features that a system employing audible tones carried by ultrasonic frequencies would have.

(1) Power: As long as the size of a sound generator is smaller than the wavelength, the power output is proportional to the fourth power of the frequency. That is, the power output of a given sized generator is much higher at high frequencies than it is at low frequencies. Hence, this property makes it simpler to produce high output at high frequencies with smaller generators. This would imply that a 30,000 Hz generator could produce the same sound intensity as a 30 Hz generator $10^{12}$ times its size. This property makes it fairly simple to produce high power outputs with fairly small generators.

(2) Directivity: The diffraction angle of a reflector or lens in a projector is proportional to the wavelength of the sound divided by the diameter of the reflector lens. Since a 30,000 Hz sound wave has a wavelength of 1 cm., parabolic reflectors with diameters of about 1 mtr. will provide excellent directivity. In addition, the short wavelength will make it possible to quickly design "beams" that will possess features, such as fairly sharp shadow regions, so that persons will have a definite perception of the desired effect in the "illuminated" region, but little in the "shadow". Invisible barriers are thus possible. In addition, the relatively small arrays can conceivably be mounted on helicopters, remotely powered aircraft, or balloons.

(3) Stealthiness: Combination tones are produced in the heads of those exposed to both beams. Since the sounds from the individual projectors are inaudible, it will not be easy to identify them as the source of the sound. This will make it difficult for the crowd to respond by attacking the system. In addition, the appearance of sounds in their heads from no apparent source will create alarm or fear in the exposed group. This effect by itself will probably cause a crowd to disperse, particularly if the crowd were composed of unsophisticated or superstitious people.

Effects of the System

The primary psychological difference between this system and other proposed systems using sound for crowd control is the property creating the sound within the head of the target individual. The effect on a person who suddenly starts to hear sounds with no apparent source is not known. Since most cultures attribute inner voices either as signs of madness, or as messages from spirits or demons, both of which will invoke powerful emotional reactions, it is expected that the use of a voice will have an immediate intense effect.

Another effect is the low (less than 100 Hz) frequency sound. There are several reasons for this. First, these low frequency sounds will have a higher amplitude, in general, than the voice frequency sounds. Second, sounds at these low frequencies have been shown to increase the suggestiveness or apprehensiveness of exposed persons.

A system using a barrier array so that a person would feel more and more apprehensive as he/she moved in a given direction, and less if he/she turned around and went out. This may require a "trigger", such as a soft voice suggesting that it is dangerous and one should go back might work, in addition to the low frequency sound.

In addition, interference with the brain's alpha rhythm of a targeted individual or group may be achieved. This may cause temporary incapacitation, intense feelings of discomfort which would cause immediate dispersal of the crowd, or departure of the targeted leader.

Other sound patterns are possible, either alone or in combination. Sounds such as random shots, or screams may be very effective when combined with low frequency sounds producing apprehensiveness.

A leader could be singled out by using highly focused beams projected from one projector system 60, that target only the head region of a single person. The sound patterns described above could be used, or one could use the speaker's own voice, with an appropriate delay. The pattern selected would depend on whether it is desired to disrupt the speaker or his speaking ability.

Return to the Situations Described in the Background Section

Whether to use two projector system 10 or one projector system 60 depends on the applicable situation. For example, in the "Somalia" situation, the best effect could probably be achieved by using projector system 10, wherein one projector focused on the individual and another broad beam device targeting the crowd. A frequency near the alpha frequency would be directed at the individual to disorient him/her and perhaps make him/her collapse.

The crowd could be handled in a different way, for example, with sounds that induce apprehensiveness, without disabling. Ideally, the crowd would disperse, leaving the leader to be apprehended. In fact, certain characteristic sounds may be known to a particular culture that indicate that a person has a dreaded disease, such as the plague. This, together with sounds causing general apprehensiveness, might work.

The crowd on a dock described in the Haiti example, would be handled in roughly the same way. Sounds causing general discomfort would be mixed with other, for example, culturally specific sounds that would incite fear and discomfort. The intensity of the sounds could be increased for a while, then followed by a scream, or some related noise. Since the source of the sounds is not readily obvious, there will probably be general panic and fleeing.

An ultrasonic device may also be used to control looting crowds, instead of the more harmful tear gas after hard to control crowds. Additionally, the difficult task of removing residual tear gas is eliminated. An ultrasonic device would be used to control the crowd by exposing them to disorienting sounds, and sounds inducing fear.

Technical Description of the Method

The operation of the embodiments illustrated in FIGS. 1–3 will now be described. The system depends largely on the operation of the response of the ear to "moderately" loud sounds, where "moderately" implies sounds loud enough to drive the ear into a non-linear response mode. The non-linear response of the ear to high amplitude sounds is discussed by, for example, Helmholtz.

The Response of the Ear

Let S(t) represent the total pressure incident on an eardrum, and the net vibrational response of the mechanism involved in hearing by:

$$R(t)=F(S(t))$$

which simply states that the response is a function of stimulus.

A power series expansion of the function F, results in:

$$R(t)=A*S(t)+B*(S(T))^2+C*(S(t))^3+\ldots$$

The higher powers having been dropped. A possible constant term is also dropped since it is clear that there is no response when there is no stimulus.

The expression when the stimulus includes two tones with frequency $f_1$ and $f_2$, respectively are:

$$S(t)=a*\cos(f_1t)+b*\cos(f_2t)$$

The amplitude of the two sounds are a and b.

From the expressions above:

$$R(t)=A*a*\cos(f_1t)+A*b*\cos(f_2t)+B*\{a^2*\cos^2(f_1t)+b^2*\cos^2(f_2t)+2*a*b*\cos(f_1t)*\cos(f_2t)\}+(\text{terms of the third power})$$

Using standard trigonometric identities, the terms in the second line of the equation become:

$$B*\{a^2*(1+\cos(2f_1t))/2+b^2*(1+\cos(2f_2t))/2+a*b*(\cos[(f_1+f_2)t]+\cos[f_1-f_2)t]]\}$$

If all of the constants in the expansion of F except A are zero, the response would be perfectly linear. That is, any number of tones would produce a response which contains all of the frequencies in the incident pressure wave and no others. The amplitude of any tone in the response would be proportional to its amplitude in the incident wave.

If B is not zero, the bracketed terms in the last expression will be present in the response. Assuming that a and b are "small" (less than one) and about the same size, then $a^2$, $b^2$, and ab will be smaller than a or b. Even if B were equal to A, the quadratic terms in the response would be smaller than the linear terms. However, as a and b get larger, the relative size of $a^2$, $b^2$, and ab to a and b grows. Mathematically this occurs where a and b are greater than one. Thus, the relative amplitudes of the quadratic terms in the response:

$$B*a^2,\ B*^{b2},\ \text{and } B*a*b$$

increase relative to A*a and A*b.

The behavior discussed above describes the behavior of the ear. When sound amplitudes are small, the ear hears the incident tones and no others. When the amplitudes are larger, combination tones corresponding to frequencies $(f_1+f_2)$ and $(f_1-f_2)$ are heard. Recent studies at 350 Hz have measured that when the primary tones have an amplitude of about 55 db, the second harmonic has an intensity about 40 to 45 db below the fundamental. At primary tone levels of 80 db the harmonic tone is only a few db below the fundamental. A similar behavior is expected when the primary tones are ultrasonic, although the relative sizes of the linear and quadratic terms may be frequency dependent.

All of this leads to the conclusion that B is not zero, but that it is smaller than A. Experiments suggest that C is also not zero, but is probably smaller than B since frequencies corresponding to the third harmonic (although seen) are weaker than the second order terms.

Single Tone Effect

The quadratic terms in the response will now be discussed.

The cosine squared terms lead to the terms:

$$a^2/2 \tag{1}$$

and $$a^2/2*\cos(2f_1t) \tag{2}$$

with similar terms involving b and $f_2$.

Equation (1) is independent of the frequencies of the original tones and represents a constant pressure if the amplitude a is constant. The pressure represented by this term is present even if there is only one ultrasonic projector, and results in inducing audible sound with a single projector if the amplitude is not constant.

Equation (2) is twice the frequency, which will be inaudible if the original frequency is ultrasonic.

If the amplitude of the ultrasonic tone is modulated at a frequency much less than that of the ultrasonic tone (such as an audible frequency), the pressure in the ear would also be modulated. A voice, or any other complex tone, should be rendered audible by this mechanism.

Additionally, the "constant" term that results from the square of the primary tone is the square of the amplitude of the primary. If desired, signal processing can be used to induce voices since the amplitude of the original tone needs to be the square root of the voice signal. A bias can also be applied to prevent the signal going to the square root circuit from ever being negative. The square root technique can be accomplished using, for example, conventional analog circuits with, for example, a square root output, or a computer using, for example, a digital square root function.

The theory for the single tone effect will now be described. First, assume that the voice that one wishes to transmit is Fourier analyzed.

$$f(t)=a*\cos(f_1t)+b*\cos(f_2t)+\ldots$$

where only two of the components are retained to illustrate the principle. If F is the ultrasonic (carrier) frequency, the transmitted signal is:

$$C*[A+f(t)^{1/2}*\cos(Ft)$$

where C is large enough to invoke the non-linear square response:

$$C^2*[A+a*\cos(f_1t)+b*\cos(f_2t)]*[1+\cos(2*Ft)]/2 \tag{3}$$

Equation (3) can be broken inot the following terms:

$$C^2*A/2+C^2*(a*\cos(f_1t)+b*\cos(f_2t))/2+C^2*(A+a*\cos(f_1t)+b*\cos(ft))*\cos(2*Ft)/2 \tag{4}$$

The second term in equation (3) $(C^2*(a*\cos(f_1t)+b*\cos(f_2t))/2)$ is directly proportional to the corresponding term in f(t). Equation (4) includes the terms with the frequencies $(2*F+/-f_1)$. With F as an ultrasonic frequency, these tones will be inaudible. The same will be true by extension for the entire voice f(t). Thus, an audible voice signal together with inaudible ultrasonic tones will be induced by this mechanism.

Combination Tones

The terms with frequencies given by the sum and the difference of the frequencies of the original tones are called combination tones. If the two tones are ultrasonic, the sum frequency will also be ultrasonic, and hence inaudible. The difference frequency, however, will be audible if it lies in the audible range for the ear. The production of an audible difference from two inaudible ultrasonic tones was reported by Lord Raleigh. This shows that the non-linearity, experimentally verified for audible sounds, is not appreciably different for ultrasonic sounds.

In summary, a non-linearity of the ear exists giving rise to a quadratic term in the ear's response. This effect occurs both when the original sounds are audible, or ultrasonic.

If the two ultrasonic tones of different frequencies were beamed at an individual, or a crowd, the difference frequency would be heard, assuming that it lies in the audible range. The frequency could be changed in any desired pattern, or left at a constant frequency, such as a low frequency to increase apprehensivess.

If one wishes to induce a wave with a complex frequency pattern such as a voice, the wave could be used to amplitude modulate one or both of the ultrasonic waves. The frequency of the two waves would likely be the same, or else there would be a background note consisting of the difference tone. Although, it might be preferable to deliberately induce a low frequency to increase apprehensiveness.

The quadratic terms also imply that the "constant" term exists even with only one tone. Thus, a single high amplitude ultrasonic source, amplitude modulated with a voice (a square root of the voice), would induce the voice in the heads of those exposed to the signal. A one projector system, such as system 60, would be the system of choice for, for example, man-portable devices.

Beat Tones

In addition to the combination tones described above, which are due to the quadratic response of the ear, a phenomenon called the "Beat Frequency" effect occurs if the two frequencies are very close together. Beat tones are of importance in the use of very low frequencies, since they are caused by a linear response term, which is generally larger in amplitude than the combination tone.

Observing two waves with slightly different frequencies f and f+δf (with δf small), the linear response will be:

$$R(t)=A^*\{a^*\cos(ft)+b^*\cos[f+\delta f)t]\}$$

using trigonometric identities:

$$\cos\{(f+\delta f)t]=\cos(\delta ft)^*\cos(ft)-\sin(\delta ft)^*\sin(ft),$$

and $$R(t)=A^*\{[a+b^*\cos(\delta ft)]^*\cos(ft)-b^*\sin(\delta ft)\sin(ft)\}$$

Both of these terms include waves with frequency f whose amplitude is modulated at frequency δf. When f is an audible frequency, the pulsing changes in amplitude (beat) are clearly audible.

As the beats increase, the beat frequency becomes harder to distinguish and is gradually perceived as a weaker, independent tone. The beat phenomenon can thus be said to shade the combination tone phenomenon.

Two ultrasonic tones whose combination tone is a very low frequency produce a beat phenomenon, where the beat frequency would equal the combination tone frequency. In this case, the ear would perceive the beat. The amplitude of the beat will be higher than the combination tone since it arises from the linear, rather than the quadratic, response of the ear.

Hence, its likely that low frequency sounds, can be induced with particularly high amplitudes.

Producing Undistorted Sounds Using Two Ultrasonic Sound Sources

Real time computer based signal processing can be used to produce an understandable, non-distorted signal from a pair of ultrasonic projectors in the following way.

Assume a sinusoidal signal of frequency $f_1$ is fed into one of projectors 30 and 50, and the signal for broadcasting is Fourier analyzed in real time by a computer and can be written:

$$f(t)=\Sigma a_i^*\cos(f_it).$$

The computer takes each of the frequencies $f_i$ and adds $f_1$ to it, and then constructs the signal:

$$g(t)=\Sigma a_i^*\cos[(f_1+f_i)t].$$

If g(t) is amplified and then fed to the second projector, the signal in the regions where the two beams cross (sound overlap region 55 is:

$$A\cos(f_1t)+Bg(t).$$

The square of this signal is:

$$A^2\cos^2(f_1t)+B^2g^2(t)+2AB\cos\ (f_1)g(t).$$

We will ignore the first two terms as being both ultrasonic. The third term is:

$$2AB\{\Sigma a_i[\cos(f_1t)\cos(f_1+f_it)]\}$$

Using standard trigonometric identities, this is:

$$AB\{\Sigma a_i[\cos[(f_1+f_1+f_i)t]+\cos[(f_1-f_1-f_i)t]]\}$$

The first set of these sums will again be ultrasonic, thus not audible. The second set, however, is $$AB\Sigma a_i\cos(f_it)$$

(noting that: $\cos(-ft)=\cos(ft)$)

Hence, an amplified form of the signal that we wish to transmit.

Similarly, real time computer based signal processing can be used to produce an understandable, non-distorted signal from a single ultrasonic projector, wherein the square root of an input signal is produced by the computer.

Propagation and Focussing of Ultrasonic Sound

One of the great advantages of using an ultrasonic sound as a carrier for audible sounds is the ease of focussing due to the short wavelength involved. Sounds are a wave phenomenon, just as light, and can be treated mathematically by the same equations that describe light, with appropriate changes in the interpretation of the quantities involved.

Assume a point source of sound placed at or near the focus of sound mirror. Since sound is reflected by a sudden difference in the density of the material of propagation, most materials, such as metals or plastics, will serve as mirrors. As in the case of light, the position of the source at, in front of, or behind the focal point will determine the character of the wave reflected from the mirror. When using the "geometrical optics" approximation, the focal point in front of the mirror is more important. We will be most interested in the case where the sound would be brought to a point focus at some distance in front of the mirror, if we were to use the "geometrical optics" approximation. The sound wave should then be represented by a spherical wave centered on the geometric focal point of the mirror. The wave would not be a complete sphere, however, since the mirror has a finite size. Sound emitted by the source that passed beyond the mirror boundary will not be reflected and focussed at the focal point. The finite size of the mirror causes the wave to exhibit diffraction and not to focus to a geometrical point.

The most pertinent part of the analysis lies in the fact that there is a diffraction circle surrounding the focal point. The radius of the circle is 00/.610*(1/a)*f. In this formula, 1 is the wavelength (the speed of sound ($3.30$–$10^4$ cm./sec.) divided by the frequency), a is the radius of the mirror, and f is the distance to the focal point of the mirror. About 80% of the total energy striking the mirror from the source passes through the diffraction circle described above. This is the basis for the calculation of the source power required to produce a given power flux at the focal point.

By moving the source away from the close focal point of the mirror, the energy will be spread over larger areas in the vicinity of the far focal point. This will be the technique used when a crowd, rather than an individual, is to be exposed.

Another important feature of ultrasonic sound is that it is absorbed by the air to a much greater extent than audible sound. At 1 mhz, an attenuation coefficient for air is 15(1/mtr.), varying as the square of the frequency. This coefficient is for the pressure, so double the calculated value must be used to obtain the attenuation of the intensity, which depends on the square of the pressure.

Absorption is moderate for frequencies around 30 kHz, but becomes severe for 100 kHz waves. This will lead to tradeoffs between the better focussing properties of shorter waves and the lower absorption of longer waves.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus, comprising:

a unit amplitude modulating an ultrasonic signal with a square root of an information signal to produce a modulated signal; and a projector coupled to said unit and projecting the modulated signal to a listener.

2. The apparatus according to claim 1, wherein said unit comprises:

a circuit producing the square root of the information signal; and a modulator amplitude modulating the ultrasonic signal with the square root of the information signal.

3. The apparatus according to claim 2, further comprising:

a first sound source, coupled to an input of the modulator, outputting the information signal; and a second sound source, coupled to the input of the modulator, outputting the ultrasonic signal.

4. The apparatus according to claim 1, wherein the information signal comprises a voice signal.

5. A method, comprising:

modulating an ultrasonic signal with a square root of an information signal to produce a modulated signal; and projecting the modulated signal to a listener.

6. The method according to claim 5, wherein the modulating further comprises producing a square root signal from the information signal.

7. The method according to claim 6, further comprising:

amplifying the modulated signal; and transmitting the amplified modulated signal.

8. The method according to claim 5, wherein the modulating is an amplitude modulation.

9. An apparatus, comprising:

a first modulator frequency modulating a first ultrasonic signal with a first input signal to produce a first modulated ultrasonic signal;

a first ultrasonic signal source providing a second ultrasonic signal; and a broadcasting system, coupled to the first modulator and the ultrasonic signal source, broadcasting the first modulated ultrasonic signal and the second ultrasonic signal to a listener.

10. The apparatus according to claim 9, wherein the broadcasting system comprises:

a first projector, coupled to the first modulator, projecting the first modulated signal; and a second projector, coupled to the ultrasonic signal source, projecting the second ultrasonic signal.

11. The apparatus according to claim 9, further comprising:

a first input sound source, coupled to the first modulator, outputting the first input signal; and a second ultrasonic signal source, coupled to the first modulator, providing the first ultrasonic signal.

12. An apparatus, comprising:

a first modulator frequency modulating a first ultrasonic signal with a first input signal to produce a first modulated ultrasonic signal;

a first input sound source, coupled to the first modulator, outputting the first input signal;

a first ultrasonic signal source providing a second ultrasonic signal;

a second ultrasonic signal source, coupled to the first modulator, providing the first ultrasonic signal;

a second modulator amplitude modulating the second ultrasonic signal with a second input signal to produce a second modulated signal;

a second input sound source, coupled to the second modulator, outputting the second input signal;

an amplifier, coupled to an output of the second modulator, amplifying the amplitude modulated signal; and a broadcasting system, coupled to the first modulator and the ultrasonic signal source, broadcasting the first modulated ultrasonic signal and the second ultrasonic signal to a listener.

13. The apparatus according to claim 12, wherein the first and second ultrasonic signals produce a difference signal for the listener in an audible range of the listener.

14. The apparatus according to claim 12, wherein the input signal comprises a square root of an information signal.

15. The apparatus according to claim 14, wherein the information signal comprises a voice.

16. A method, comprising:

frequency modulating a first ultrasonic signal with a first input signal to produce a first modulated signal;

providing a second ultrasonic signal; and broadcasting the first modulated signal and the second ultrasonic signal to a listener.

17. A method, comprising:

frequency modulating a first ultrasonic signal with a first input signal to produce a first modulated signal;

providing a second ultrasonic signal;

amplitude modulating the second ultrasonic signal with a second input signal to produce a second modulated signal; and amplifying the amplitude modulated signal; and broadcasting the first modulated signal and the second ultrasonic signal to a listener.

18. The method according to claim 17, further comprising:

emitting the first and second modulated signals in the audible range of the listener.

19. An apparatus for broadcasting an audible sound using an ultrasonic sound as a carrier such that at least one person exposed to the ultrasonic sound can hear the audible sound, without detecting the source of the sound, comprising:

an information sound source outputting an information signal;

an ultrasonic sound source outputting the ultrasonic sound;

a square root circuit, coupled to the sound source, producing a square root of the information signal output by the information sound source;

an ultrasonic modulator, coupled to the square root circuit and the ultrasonic sound source, amplitude modulating the ultrasonic sound with the square root of the information signal to produce a modulated signal;

an amplifier, coupled to the ultrasonic modulator, amplifying the modulated signal; and a projector unit, coupled to the amplifier, projecting the modulated signal such that the audible signal is detected by the at least one person.

20. An apparatus for broadcasting first and second audible sounds using first and second ultrasonic sounds, respectively, as a carrier such that at least one person exposed to the ultrasonic sounds can hear the audible sounds, without detecting the source of the sounds, comprising:

a first information sound source outputting a first information signal;

a second information sound source outputting a second information signal;

a first ultrasonic sound source outputting a first ultrasonic signal;

a second ultrasonic sound source outputting a second ultrasonic signal;

a first modulator, coupled to the first ultrasonic sound source and the first information sound source, frequency modulating the first ultrasonic signal with the first information signal to produce a first modulated signal;

a second modulator, coupled to the second ultrasonic sound source and the square root circuit, frequency modulating the second ultrasonic sound with the second information signal to produce a second modulated signal;

a first projector unit, coupled to the first modulator, projecting the first modulated signal to the at least one person; and a second projector unit, coupled to the second modulator, projecting the second modulated signal to the at least one person.

21. An apparatus, comprising:

a unit modulating an ultrasonic signal with the square root of an information signal to produce a modulated signal in which the information signal is intelligible to a listener; and a projector coupled to the unit and projecting the modulated signal to the listener.

* * * * *